US008819281B2

(12) United States Patent
Den Hartog et al.

(10) Patent No.: US 8,819,281 B2
(45) Date of Patent: Aug. 26, 2014

(54) METHOD AND SYSTEM FOR FORWARDING A MESSAGE IN A SESSION INITIATION PROTOCOL BASED COMMUNICATIONS NETWORK

(75) Inventors: Jos Den Hartog, Capelle A/d Ijssel (NL); Rogier August Caspar Noldus, Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 194 days.

(21) Appl. No.: 13/504,556

(22) PCT Filed: Nov. 5, 2009

(86) PCT No.: PCT/EP2009/064714
§ 371 (c)(1),
(2), (4) Date: May 24, 2012

(87) PCT Pub. No.: WO2011/054390
PCT Pub. Date: May 12, 2011

(65) Prior Publication Data
US 2013/0117467 A1 May 9, 2013

(51) Int. Cl.
*G06F 15/173* (2006.01)
(52) U.S. Cl.
USPC .......... 709/244; 709/206; 709/230; 709/238; 709/245; 370/352
(58) Field of Classification Search
USPC .......... 709/206, 230, 238, 244, 245; 370/352
See application file for complete search history.

(56) References Cited

U.S. PATENT DOCUMENTS

| 6,721,401 | B2 * | 4/2004 | Lee et al. ................ 379/93.17 |
| 7,085,260 | B2 * | 8/2006 | Karaul et al. ................ 370/352 |
| 8,335,212 | B2 * | 12/2012 | Hovey et al. ................ 370/356 |
| 8,472,431 | B2 * | 6/2013 | Siegel et al. ................ 370/352 |
| 8,477,763 | B2 * | 7/2013 | Pallares-Lopez et al. .... 370/352 |
| 2006/0077965 | A1 * | 4/2006 | Garcia-Martin et al. ..... 370/352 |
| 2009/0190573 | A1 * | 7/2009 | Siegel et al. ................ 370/352 |

OTHER PUBLICATIONS

3rd Generation Partnership Project. "Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 version 7.11.0 Release 7)." 3GPP Standards, European Telecommunications Standards Institute (ETSI) TS 129 228 V7.11.0, Apr. 2009, Sophia Antipolis Cedex, France.

(Continued)

*Primary Examiner* — Liangche A Wang
(74) *Attorney, Agent, or Firm* — Coats & Bennett, PLLC

(57) ABSTRACT

Method and system for forwarding a message in a Session Initiation Protocol, SIP, based communications network, to a first and second SIP user equipment of a subscriber via a controller server and one of a plurality of traffic handler servers. The first user equipment may have first capabilities different from second capabilities of the second user equipment. The controller server receives the message; determines which first traffic handler server of the plurality of traffic handler servers is arranged for providing a first service associated with the first capabilities, and which second traffic handler server of the plurality of traffic handler servers is arranged for providing a second service associated with the second capabilities; and forwards the message to the first user equipment via the first traffic handler server, and to the second user equipment via the second traffic handler server.

17 Claims, 4 Drawing Sheets

(56) References Cited

OTHER PUBLICATIONS

3rd Generation Partnership Project. "3rd Generation Partnership Project; Technical Specification Group Services and System Aspects; Feasibility Study on IMS Evolution; (Release 9)." 3GPP TR 23.812 V0.5.1, Apr. 2009, Sophia Antipolis Valbonne, France.

3rd Generation Partnership Project. "Digital Cellular Telecommunications System (Phase 2+); Universal Mobile Telecommunications System (UMTS); LTE; IP Multimedia Subsystem (IMS); Stage 2 (3GPP TS 23.228 version 8.9.0 Release 8)." 3GPP Standards, European Telecommunications Standards Institute (ETSI) TS 123 228 V8.9.0, sections 4.2.4b, 4.2.7, 4.3.3, 4.6.1, 4.6.3, 5.1.2, 5.2.1, 5.2.2, 5.5.2, 5.6.2, 5.11.5, J.2, Jun. 2009, Sophia Antipolis Cedex, France.

* cited by examiner

METHOD AND SYSTEM FOR FORWARDING A MESSAGE IN A SESSION INITIATION PROTOCOL BASED COMMUNICATIONS NETWORK

TECHNICAL FIELD

The invention relates to transfer of a message in a Session Initiation Protocol (SIP) based communications network in general. The invention relates to a method and system for forwarding a message in a Session Initiation Protocol, SIP, based communications network, to a first SIP user equipment of a subscriber and to a second SIP user equipment of the subscriber. More in particular the invention relates to an Internet Protocol (IP) Multimedia Subsystem (IMS) network.

BACKGROUND

An Internet Protocol Multimedia Subsystem (IMS) subscriber can be registered, as user of the IMS network, on multiple user equipment. Thereto, a User Agent associated with the subscriber has registered itself with contact addresses for the respective user equipment. The subscriber will be registered in a Serving Call Session Control Function (S-CSCF) entity. In the S-CSCF entity, the contact addresses for these user equipment are stored, for as long as the registration of each user equipment is valid. The contact addresses constitute addresses identifying or related to these user equipment, facilitating the S-CSCF entity to forward a message to these user equipment. An IMS-subscriber can subscribe to multiple services. These services are executed by service logic located in one or multiple Session Initiation Protocol Application Servers (SIP-AS's). In the S-CSCF entity, Initial Filter Criteria (IFC) for an IMS subscriber, executed by the S-CSCF entity, point to these SIP-AS's. The IFC consists of a set of regular expressions, analysed and acted upon at call set-up or at registration. The IFCs are stored in the S-CSCF entity during registration. For each subscriber there may be a specific set of IFC.

After execution of the services in the SIP-AS's, the S-CSCF entity distributes the SIP Invite to the registered devices, e.g. by means of forking.

SUMMARY

The above described method has the drawback that not always for each user equipment optimum use is made of the capabilities of such user equipment by service(s) for that user. An objective of the present invention is to at least partially remove said drawback.

Thereto, according to the invention is provided a method of forwarding a message in a Session Initiation Protocol, SIP, based communications network, to a first SIP user equipment associated with a User Agent, UA, corresponding to a subscriber via a controller server and one of a plurality of traffic handler servers, and to a second SIP user equipment associated with the User Agent, UA, corresponding to the subscriber via the controller server and one of the plurality of traffic handler servers, the first user equipment having first capabilities and the second user equipment having second capabilities different from the first capabilities, the method comprising the steps of receiving, by the controller server, the message; determining which first traffic handler server of the plurality of traffic handler servers is arranged for providing a first service associated with the first capabilities, and which second traffic handler server of the plurality of traffic handler servers is arranged for providing a second service associated with the second capabilities; and forwarding the message from the controller server to the first user equipment via the first traffic handler server, and to the second user equipment via the second traffic handler server. In accordance with existing art, the controller server has learned, during registration of each user equipment, what capabilities are supported by that user equipment. It further be understood that the first service and the second service may differ from one another through their service logic behaviour for the respective user equipment capabilities, rather than through the service logic as such.

Thus, each user equipment receives the message via a traffic handler server capable of providing the service ('first service' or 'second service') corresponding to the capabilities of that user equipment. Hence, optimum use can be made of the capabilities of the user equipment, for each user equipment.

Optionally, the method further comprises storing, in a repository associated with the controller server, information with respect to each traffic handler server of the plurality of traffic handler servers relating to the services said each traffic handler server is arranged to offer.

Optionally, the method further comprising storing, in the repository, a user profile associated with the subscriber, the user profile including an indication of services which the subscriber is able and/or allowed to use, e.g. relating to the first and second capabilities.

It is possible for the controller server to determine which first traffic handler server of the plurality of traffic handler servers is arranged for providing the first service associated with the first capabilities, and which second traffic handler server of the plurality of traffic handler servers is arranged for providing the second service associated with the second capabilities, on the basis of said information with respect to each traffic handler server and on the basis of the user profile. It is possible that the step of determining comprises determining on the basis of said information and user profile, which traffic handler server of the plurality of traffic handler servers shall forward the message to the first user equipment, and which traffic handler server of the plurality of traffic handler servers shall forward the message to the second user equipment.

Optionally, the controller server is arranged for selecting a traffic handler server providing the services associated with the capabilities that are common to all user equipment of the subscriber. Hence, a traffic handler server may be identified capable of addressing all user equipment of the subscriber.

The invention also relates to a system for forwarding a message in a Session Initiation Protocol, SIP, based communications network, to a first SIP user equipment associated with a User Agent corresponding to a subscriber and to a second SIP user equipment associated with the User Agent corresponding to the subscriber, the first user equipment having first capabilities and the second user equipment having second capabilities different from the first capabilities, the system comprising a controller server associated with the subscriber, and a plurality of traffic handler servers, wherein the controller server is arranged for receiving the message, wherein the controller server is further arranged for determining which first traffic handler server of the plurality of traffic handler servers is arranged for providing a first service associated with the first capabilities, and which second traffic handler server of the plurality of traffic handler servers is arranged for providing a second service associated with the second capabilities, and wherein the controller server is further arranged for forwarding the message to the first user equipment via the first traffic handler server, and to the second user equipment via the second traffic handler server.

The invention also relates to a controller server of this system. The invention also relates to a traffic handler server of this system.

Optionally, the SIP based communications network is an IMS communications network. Optionally the controller server is a Serving Call Session Control Function, S-CSCF, entity. Optionally the traffic handler servers are S-CSCF entities. Optionally the services are located in SIP Application Servers (SIP-AS's) associated with the traffic handler servers.

Optionally, the controller server and at least one, preferably more than one, traffic handler server of the plurality of traffic handler servers are arranged in a monolithic structure. The monolithic structure may for instance be a S-CSCF entity.

The invention also relates to a server entity for forwarding a message in a Session Initiation Protocol, SIP, based communications network, to a first SIP user equipment associated with a User Agent and to a second SIP user equipment associated with the User Agent, the first user equipment having first capabilities and the second user equipment having second capabilities different from the first capabilities, wherein the server entity is arranged for receiving the message, wherein the server entity is further arranged for determining which first network nodes of a plurality of network nodes is arranged for providing a first service associated with the first capabilities, and which second network node of the plurality of network nodes is arranged for providing a second service associated with the second capabilities, and wherein the server entity is further arranged for forwarding the message to the first user equipment via the first network node, and to the second user equipment via the second network node.

The invention also relates to a system for forwarding a message in a Session Initiation Protocol based communications network, the system comprising a controller server associated with the subscriber, and at least one traffic handler server, wherein the controller server is arranged for handling Session Initiation Protocol registrations and maintaining subscriber data, and wherein the at least one traffic handler server is arranged for handling Session Initiation Protocol sessions and/or third party registration. Herein the controller server may be excluded from handling Session Initiation Protocol sessions and/or third party registration, and the at least one traffic handler server may be excluded from handling Session Initiation Protocol registrations and maintaining subscriber data. Thus, a functional split between the controller server and the at least one traffic handler server is obtained. The controller server may be arranged for submitting subscriber data needed for executing the Session Initiation Protocol session handling and/or third party registration to the at least one traffic handler server at the moment that the controller server selects a traffic handler server to execute the Session Initiation Protocol session handling and/or the third party registration.

The invention also relates to a controller server of this system. The invention also relates to a traffic handler server of this system.

Optionally, the SIP based communications network is an IMS communications network. Optionally the controller server is a Serving Call Session Control Function, S-CSCF, entity. Optionally the at least one traffic handler server is a S-CSCF entity. It will be appreciated that thus the controller server functionality and traffic handler functionality are split and assigned to separate entities, viz. the controller server and the traffic handler server. Optionally, the controller server and at least one traffic handler server are arranged in a monolithic structure. The monolithic structure may for instance be a S-CSCF entity.

BRIEF DESCRIPTION OF THE DRAWINGS

The invention will now be further elucidated by means of non-limiting examples referring to the drawing, in which.

DETAILED DESCRIPTION

Figure 1:
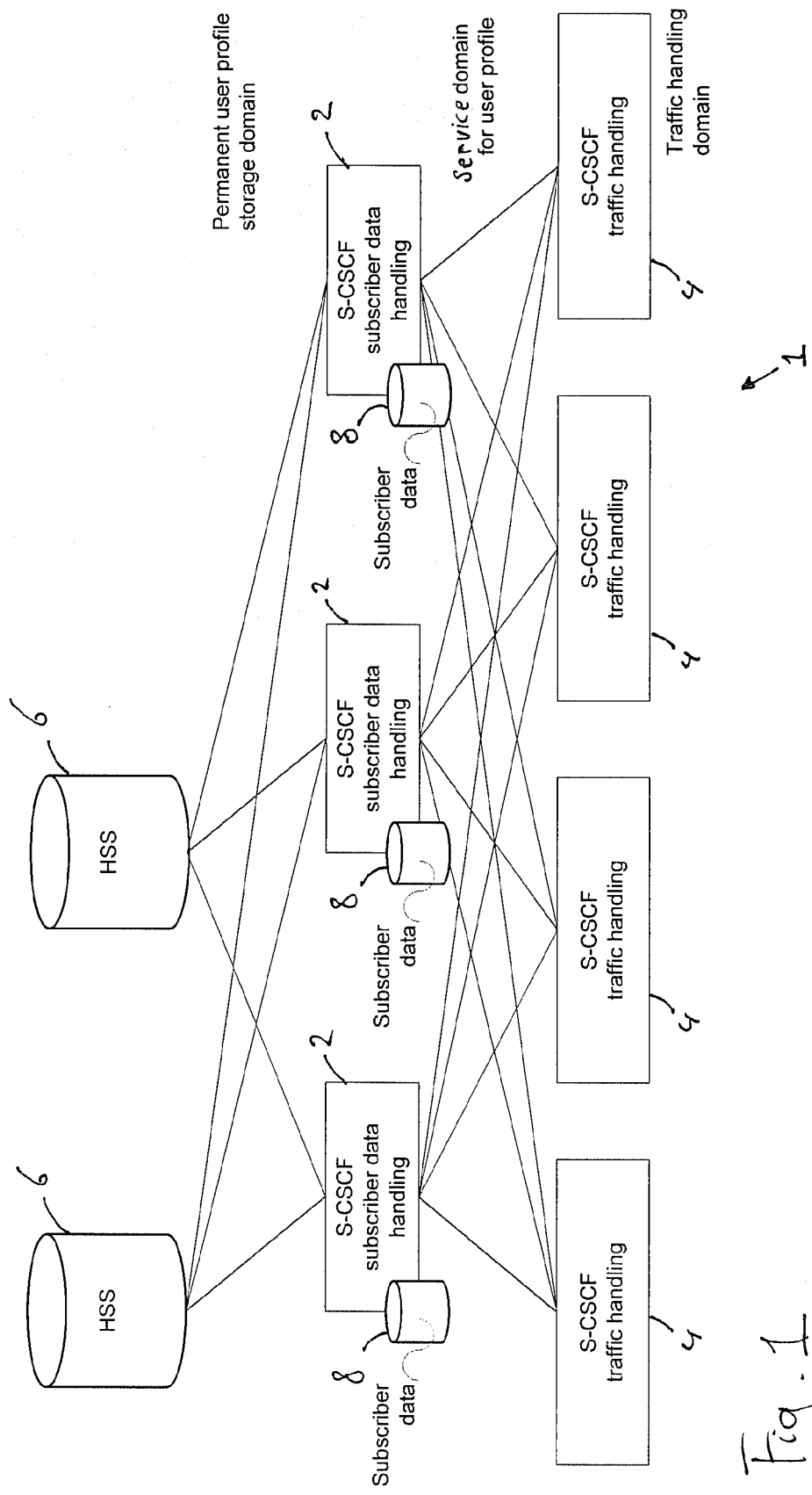
FIG. 1 shows an example of an architecture with split S-CSCF implementation.

In this example is referred to an Internet Protocol (IP) Multimedia Subsystem (IMS) communications network as an example of a Session Initiation Protocol (SIP) based communications network. The Serving Call Session Control Function (S-CSCF) entity, also referred to as S-CSCF server, functions as registrar in the IMS network. It performs the following tasks:

1. Subscriber registration: IMS subscribers may register at one of the S-CSCF entities in the IMS network. Thereto, a User Agent, UA, associated with the IMS subscriber may register with the S-CSCF. IMS registration may be split up in the following two sub activities:
    a. Authentication, authorisation, subscriber profile download from the Home Subscriber Server (HSS);
    b. Third party registration, entailing that the S-CSCF entity forwards the IMS registration, potentially modified, to one or more SIP application servers.

2. Session handling: a SIP session from or to an IMS subscriber traverses the S-CSCF associated with that subscriber. That S-CSCF entity takes care of (list is not exhaustive):
    a. routing the SIP request towards the intended User Agent Server (UAS), e.g. towards the intended user equipment of the subscriber;
    b. third party service invocation, entailing that the S-CSCF entity passes the SIP request through one or more SIP application servers (SIP-AS's);
    c. relaying subsequent SIP requests and responses to and from the IMS subscriber.

Within an IMS network, subscribers may be allocated to a specific S-CSCF entity. This allocation is done at the time of registration. The IMS subscriber may remain allocated to that S-CSCF entity as long as she remains registered as IMS subscriber, i.e. remains registered with at least one SIP user equipment.

The selection of the S-CSCF entity for the subscriber is done by an Interrogating Call Session Control Function (I-CSCF) entity during the registration procedure. The I-CSCF entity bases the selection of the S-CSCF entity on, amongst others, the required S-CSCF capabilities for this subscriber. An indication of these capabilities may be received from the HSS. The I-CSCF entity selects a S-CSCF for this subscriber that matches these capabilities. 'S-CSCF capabilities' may relate to internal S-CSCF capabilities, but may relate also to capability of the S-CSCF entity to invoke specific SIP Application Servers.

Generally in prior art IMS networks, the allocation of the S-CSCF entity to a subscriber, i.e. to a User Agent associated with the subscriber, is static. The distribution of subscribers over the S-CSCF entities in the IMS network does not consider the usage by these subscribers of IMS services. Hence, the distribution of subscribers over the S-CSCF entities may typically not be adapted to the traffic activity. In addition, the subscriber may be allocated to a particular S-CSCF entity based on required S-CSCF capability. That subscriber may, however, make little or no use of that particular capability.

The above dilemma may be attributed to the fact that a subscriber is allocated to an entire S-CSCF. Put differently, when a subscriber is registered in a S-CSCF, then the S-CSCF allocates (and hence reserves) the following categories of resources for this subscriber a) subscriber registration, and b) traffic handling.

According to one aspect of the present invention, a split of S-CSCF functionality is proposed into the following components a) subscriber data handling, and b) traffic handling.

FIG. 1 shows example architecture of an IMS communications network 1 with split S-CSCF functionality implementation. The subscriber data handling is performed by the 'subscriber data handling' part 2 of the S-CSCF entity, further referred to as controller server. The traffic handling is performed by the 'traffic handling' part 4 of the S-CSCF entity, further referred to as traffic handler server.

The controller server 2 handles SIP registrations and maintains subscriber data, including subscriber's contact address details. Hence, a subscriber is registered with a controller server, but not with a traffic handler server.

The traffic handler server 4 handles SIP sessions and third party registration. It does not store any subscriber data; subscriber data that is needed to execute the task of SIP session handling and for third party registration is received from the controller server at the moment that the controller server selects a traffic handler server to execute the third party registration or the SIP session handling.

FIG. 1 also depicts a functional split of the IMS network in the following domains:

Permanent user profile storage domain: This is the domain where the user data is permanently stored. It contains the HSS 6. The HSS may be an integrated HSS or an HSS front-end in combination with Centralised user database.

Service domain for user profile: For each subscriber, the user profile data is contained in a service entity in the IMS network. The service entity for user profile data is in this example formed by the controller server 2.

Traffic handling domain: The traffic handling domain contains the functional entities that perform SIP session establishment and control. In this example, this domain contains, amongst others, the traffic handler servers 4.

It will be appreciated that the two components 2, 4 of the S-CSCF entity, namely the controller server 2 and the traffic handler server 4, may reside on different platforms. This may provide the advantages that the controller server functionality is a function that has little traffic control requirement; on the other hand, the controller server contains subscriber data and hence is preferably built on a reliable computing platform.

In this example, the controller server 2 comprises a repository 8, here including a database (e.g. Oracle). The subscriber data that is maintained in the controller server repository 8 includes subscriber data received from the HSS 6 and contact address information relating to the user equipment at which the subscriber can be contacted.

The dimensioning of the controller server may be (mainly) based on the expected average number of registered subscribers and (to a lesser extent) based on the expected average number of SIP registrations and SIP session establishments.

The main task of the traffic handler server 4 is to handle the third party registrations and the SIP traffic, including third party call control.

The dimensioning of the traffic handler server may be based on the traffic density. Since the traffic handler server in this example does not store subscriber data, it does not need to include a repository. The traffic handler server does, however, include memory, for temporary storage of subscriber data when handling a SIP session to/from a subscriber.

Figure 2:
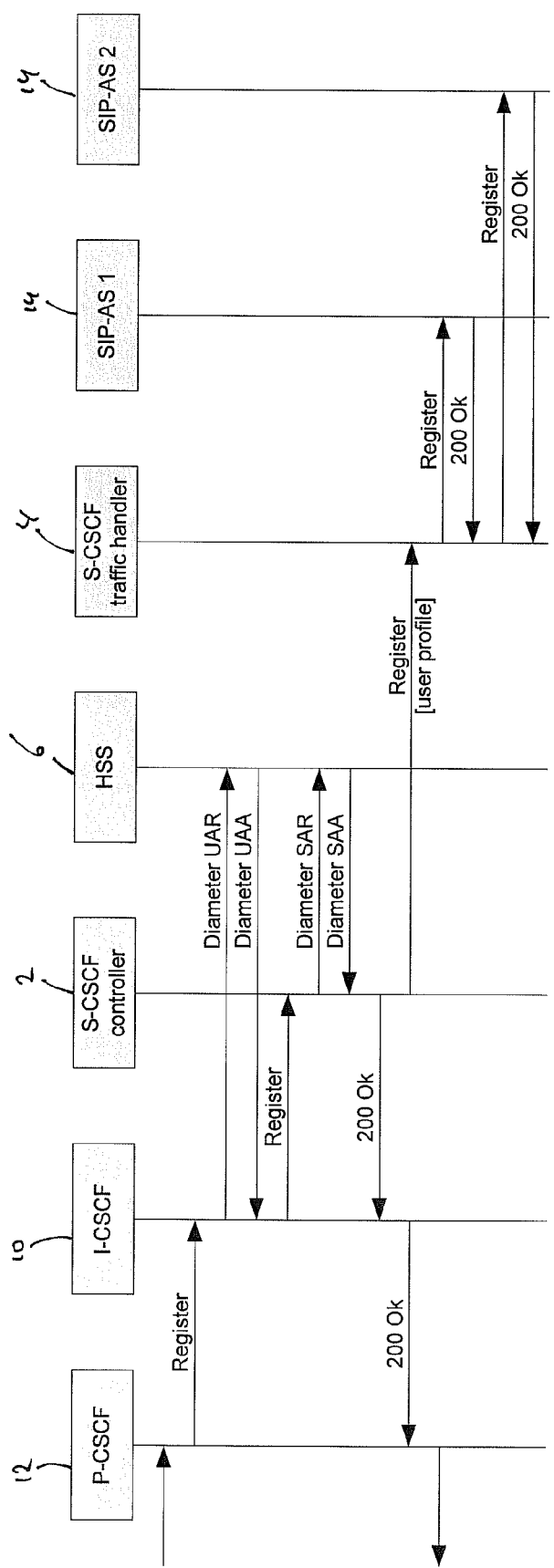
FIG. 2 shows a schematic representation of registration.

FIG. 2 shows a schematic representation of registration. For conciseness, FIG. 2 does not reflect the authentication that the S-CSCF entity 2, 4 may apply; i.e. the Diameter Multimedia Authorization Request (MAR) and Multimedia Authorization Answer (MAA) messages that may be exchanged between the S-CSCF entity and the HSS 6 are not shown.

In the example of FIG. 2 IMS registration takes place in standard manner, including selection of a Proxy Call Session Control Function (P-CSCF) entity 12 by the IMS subscriber or by the user equipment, and sending a SIP Register request message towards the IMS core network. During registration, the I-CSCF entity 10 processes the SIP Register message. The I-CSCF entity 10 receives, during SIP registration, an S-CSCF capabilities indicator from the HSS 6 (not reflected in FIG. 2). The S-CSCF capabilities indicator is used by the I-CSCF 10 entity to select an S-CSCF entity 2 where the subscriber will be registered. Different IMS subscribers may require different S-CSCF capabilities. The difference in S-CSCF capabilities for the different subscribers may relate to the capability of the S-CSCF entity to invoke SIP applications during a call. The different capabilities of the S-CSCF entity may further relate to third party registration and third party call control.

Here, the S-CSCF capabilities do not relate to the S-CSCF subscriber data handling. Therefore, the I-CSCF 10 entity may, during registration, select any of the available controller servers 2. The I-CSCF entity 10 may apply a round robin method for selecting the controller server and/or apply geographic distribution for selecting the controller server. When the I-CSCF entity has selected a controller server 2, it forwards the SIP Register message to that controller server, in accordance with standard SIP Registration methodology. The I-CSCF entity 10 forwards the S-CSCF capabilities indicator to the controller server 2, so the controller server can use this indicator when selecting the traffic handler server 4.

In this example, the controller server 2 handles HSS 6 interactions in the standard manner for authorisation. Once the subscriber is registered in the controller server, the controller server has received a user profile from HSS, which may include Initial Filter Criteria (IFC). If the IFC indicates that third party registration is needed, then the controller server 2 selects a traffic handler server 4 and forwards the SIP Register to this traffic handler server. The controller server 2 may use the aforementioned S-CSCF capabilities indicator for selecting the traffic handler server 4.

When forwarding the SIP Register to the traffic handler server 4, the controller provides also the IFC to the traffic handler server. That facilitates the traffic handler server to send the SIP Invite, possibly modified, to the respective SIP-AS's 14.

Figure 3:
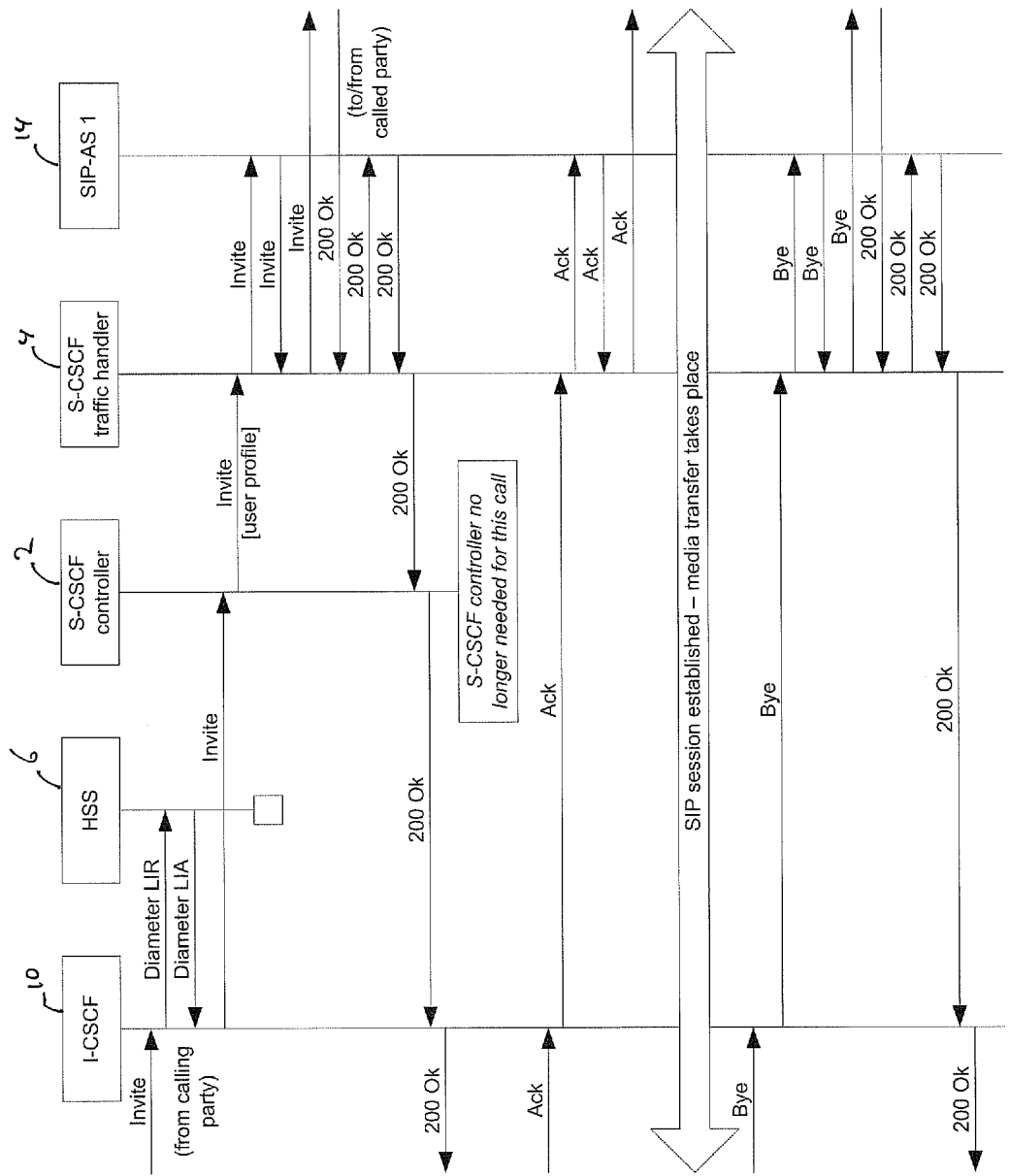
FIG. 3 shows a schematic representation of terminating SIP session establishment.

FIG. 3 shows a schematic representation of terminating SIP session establishment. When an I-CSCF entity 10 receives a SIP Invite (or other initial SIP request message) for a particular subscriber, the I-CSCF entity 10 contacts the HSS 6 to receive the S-CSCF entity address for this subscriber. The HSS has stored the address of the controller server 2 where this subscriber is registered. Hence, the I-CSCF entity 10 forwards the SIP Invite to that controller server 2. The controller server 2 comprises the user profile, e.g. in the repository 8, and will select for this SIP Invite which traffic handler server 2 is the most appropriate for handling this SIP session. In selecting the traffic handler server the controller server may use a criterion, such as required S-CSCF capability, round robin, geographic distribution, load distribution, required S-CSCF capabilities, as defined by the S-CSCF capabilities indicator received from I-CSCF.

The controller server 2 forwards the SIP Invite to the traffic handler server 4 that it had selected; this traffic handler server will handle this SIP session. Hereto, the controller server provides the relevant parts of the subscriber profile to the traffic handler server. The traffic handler server in this example is 'subscriber agnostic'; i.e. it handles the SIP session using its internal configuration and using the subscriber profile data received from the controller server for this SIP session. Notably, the subscriber's user profile contains the registered contact addresses (optionally including priority value and other contact related parameters), as well as IFC. This facilitates the traffic handler server to apply third party call control and to forward the SIP Invite to the destination subscriber.

The third party call control may be applied by an IMS service, in accordance with the IMS standard. The traffic handler server 2 has the user profile for this subscriber, so it can handle the interaction with the SIP-AS(s) 14.

In this example, the controller server 2 remains in the SIP signalling path until the SIP Invite transaction is completed. After that, the controller server does not need to remain in the SIP signalling path.

Different user equipment 18, such as a PC-client, a desktop VoIP-phone, and a mobile phone can have different capabilities, e.g. related to screen-size, processor-power, input/output-capacity, memory-size, etc.

When first all terminating services are executed for a call towards an IMS-subscriber, i.e. Towards the User Agent associated with the IMS-subscriber, and after that forking of the Invite is done towards all registered user equipment for which the contact address of that user equipment is registered for the public user identity through which the subscriber is addressed, the matching between services (or service logic behaviour) and user equipment can be sub-optimal. For example, the possible features of "enriched alerting" depend on the capabilities of the user equipment 18. When using a PC-client, the alerting can be extended with a video clip. When using a mobile phone, the alerting can have a specific ringing pattern. When (network) service and user equipment are aligned, optimal performance is possible.

According to a further aspect of the present invention, the controller server 2 matches services, such as SIP-AS's 14.*j* (j=1, 2, 3, . . . ) and/or IFC's, and user equipment 18.*n* (n=1, 2, 3, . . . ) or other parameters such as contact addresses, capabilities, etc. Thereto, the controller server may determine which services are relevant for all user equipment and which services are specific for which registered user equipment (based on capabilities of these user equipment). In an embodiment, the controller server may group the services and user equipment into "sub user profiles".

Optionally, if required, the controller server 2 may send the Invite to a traffic handler server 4.*i* (i=1, 2, 3, . . . ), wherein the Invite may include a "sub user profile" which addresses the "common services" for all user equipment 18.*n*. The Invite does not need to contain contact addresses, and the Invite may have an indication that that this traffic handler server must not interact with user equipment (contact addresses), but must "report back" to the controller server. Thereto the traffic handler server may send the Invite back to the controller server, so that the controller server may fork the Invite.

Figure 4:
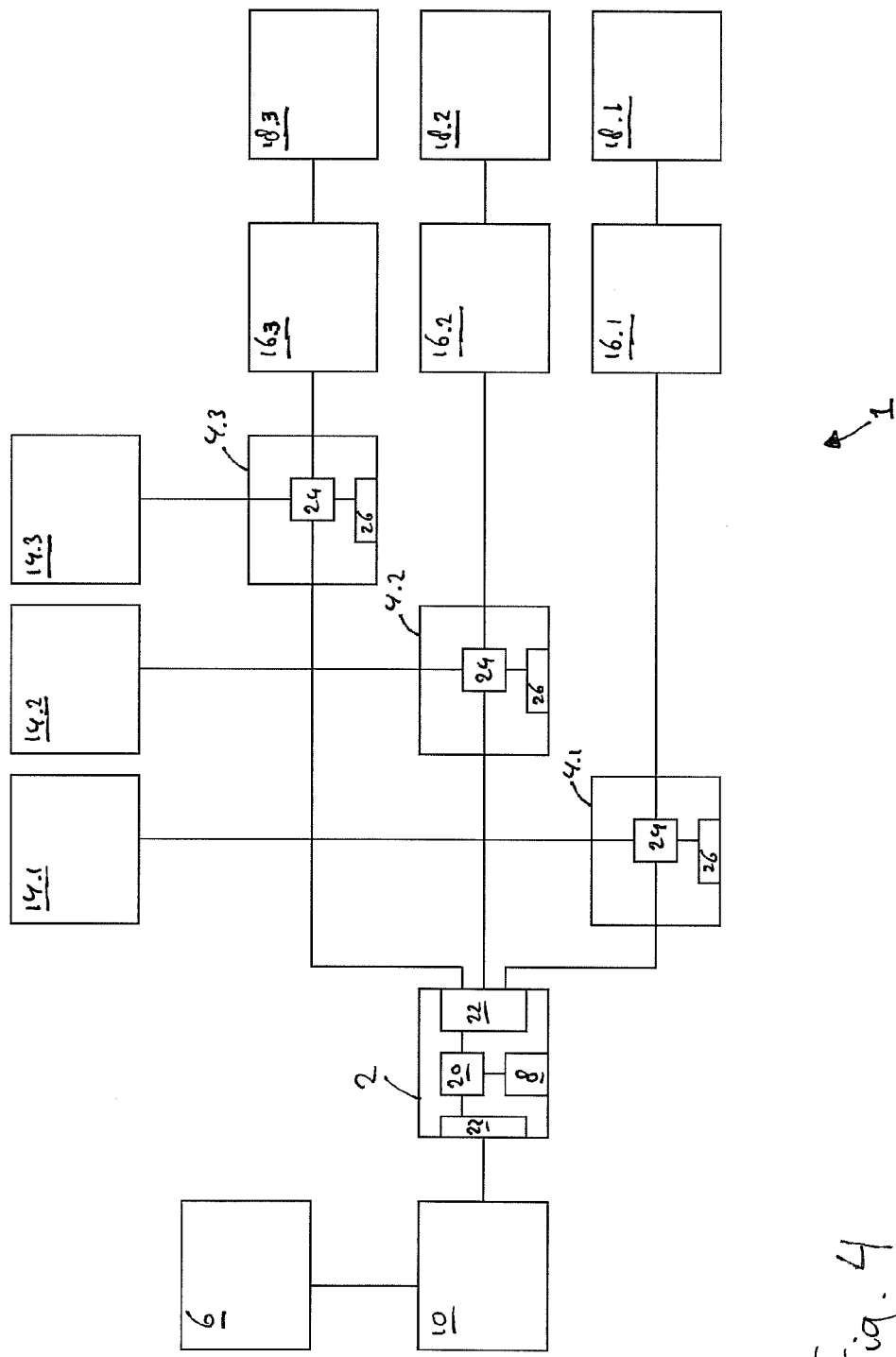
FIG. 4 shows an example of an architecture according to the invention.

The controller server forks the Invite to more than one traffic handler server 4.*i*, see FIG. 4. Each Invite sent to an individual traffic handler server 4.*i* will include a "sub user profile". Each specific "sub user profile" addresses services that are tailored for a group of user equipment 18.*n*, contains contact addresses of these user equipment that belong to the "sub user profile" and has an indication that the given contact addresses must be contacted by the relevant traffic handler server 4.*i*. The traffic handler server may temporarily store the "sub user profile" in a repository 26. The controller server 2 may coordinate the results from the different traffic handler servers 4.*i*.

Because each user equipment 18.*n* is contacted by a traffic handler server 4 having associated therewith a service (e.g. SIP-AS 14.*j*) which is tailored for the capabilities of this user equipment, the user experience is optimal.

Hence this example relates to an IMS communications network 1 wherein a SIP message is transferred from an I-CSCF entity 10, to a first SIP user equipment 18.1 associated with a User Agent corresponding to a subscriber and to a second SIP user equipment 18.2 associated with the User Agent corresponding to the subscriber. Herein, the first user equipment may have first capabilities and the second user equipment may have second capabilities different from the first capabilities. In this example, The S-CSCF entity is split into a controller server 2 associated with the registered subscriber, and a plurality of traffic handler servers 4.*i*. The controller server 2 comprises an input/output unit 22 arranged for receiving the message. The controller server further comprises a determination unit 20 arranged for determining which first traffic handler server of the plurality of traffic handler servers is arranged for providing a first service associated with the first capabilities, and which second traffic handler server of the plurality of traffic handler servers is arranged for providing a second service associated with the second capabilities. The controller server, e.g. using the input/output unit 22, forwards the message to the first user equipment 18.1 via the first traffic handler server 4.1, and to the second user equipment 18.2 via the second traffic handler server 4.2. The traffic handler servers may thereto use input/output units 24

In this example, the controller server 2 has the repository 8 associated therewith. Here the repository 8 includes information with respect to each traffic handler server 4.*i* of the plurality of traffic handler servers relating to the services said each traffic handler server is arranged to offer. Here the repository also includes the user profile associated with the subscriber, the user profile including an indication of services which the subscriber is able and/or allowed to use, e.g. relating to the first and second capabilities.

The determination unit 20 may be arranged for determining, on the basis of the information and the user profile, which traffic handler server of the plurality of traffic handler servers 4.*i* is to forward the message to the first user equipment 18.1, and which traffic handler server of the plurality of traffic handler servers is to forward the message to the second user equipment 8.2.

In the foregoing specification, the invention has been described with reference to specific examples of embodiments of the invention. It will, however, be evident that various modifications and changes may be made therein without departing from the broader spirit and scope of the invention as set forth in the appended claims.

In the examples is referred to an IMS communications network. It will be appreciated that the invention may also be practiced in alternative SIP based communications networks, such as for instance a voice over IP (VOIP) network.

The invention disclosure has so far described how the concept of split S-CSCF functionality may be applied to distributed S-CSCF entity deployment. The invention may, however, also be applied to a monolithic S-CSCF entity. The monolithic S-CSCF entity according to the present invention contains as functional entities the S-CSCF control part and the S-CSCF traffic part. The S-CSCF control part handles SIP registration, including re-registration and de-registration. SIP registration may include third party registration, entailing that a SIP Register is sent to an Application server. The monolithic S-CSCF entity may contain one or more S-CSCF traffic parts. The S-CSCF traffic part handles SIP sessions. When the monolithic S-CSCF contains multiple S-CSCF traffic parts, then each S-CSCF traffic part may have a specific session handling capability.

The advantages described for the distributed S-CSCF entities controller server and traffic handler server apply also to a monolithic S-CSCF entity. One difference may be found in that a monolithic S-CSCF uses standard SIP signalling towards other entities, so it does not affect the remainder of the network and does not require standardisation. The monolithic S-CSCF entity has the advantage, that the operator can deploy geographically distributed monolithic S-CSCF entities (i.e. S-CSCF entities spread out over a geographical area), whereby each S-CSCF entity supports all available types SIP sessions. Each monolithic S-CSCF entity may then be configured with one or more S-CSCF traffic parts, depending on the kinds of SIP sessions that need to be supported in the network.

A monolithic S-CSCF according to the present invention may provide improved resilience. When a S-CSCF traffic part restarts, the SIP sessions that were handled by that S-CSCF traffic part are lost. But the SIP sessions being handled by the other S-CSCF traffic parts are not affected. Neither is the subscriber data in the S-CSCF control part. An embodiment of the monolithic S-CSCF entity according to the invention may use processor boards (e.g. Integrated Site (IS) blades) with high availability and reliability for the S-CSCF traffic part and processor boards with ultra high availability and reliability for the S-CSCF control part.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method of forwarding a message, in a Session Initiation Protocol (SIP) based communications network and to a first SIP User Equipment associated with a SIP User Agent corresponding to a subscriber, via a controller server comprising a Serving Call Session Control Function entity and one of a plurality of traffic handler servers comprising Serving Call Session Control Function entities, and forwarding the message to a second SIP User Equipment associated with the SIP User Agent corresponding to the subscriber, via the controller server and one of the plurality of traffic handler servers, the first SIP User Equipment having first capabilities and the second SIP User Equipment having second capabilities different from the first capabilities, the method comprising:

receiving, by the controller server, the message, the controller server configured to handle SIP registrations and maintain subscriber data;

determining which first traffic handler server of the plurality of traffic handler servers is configured to provide a first service associated with the first capabilities, and determining which second traffic handler server of the plurality of traffic handler servers is configured to provide a second service associated with the second capabilities, each traffic handler server configured to handle at least one of SIP sessions and third party registrations; and forwarding the message from the controller server to the first SIP User Equipment via the first traffic handler server, and forwarding the message to the second SIP User Equipment via the second traffic handler server.

2. The method of claim 1 further comprising storing, in a repository associated with the controller server, information with respect to each traffic handler server of the plurality of traffic handler servers relating to the services each traffic handler server is configured to offer.

3. The method of claim 2 further comprising storing, in the repository, a user profile associated with the subscriber, the user profile including an indication of services which the subscriber is at least one of able to use and allowed to use.

4. The method of claim 3 wherein the indication of services relates to the first and second capabilities.

5. The method of claim 3 wherein the determining comprises determining, based on the stored information with respect to each traffic handler server and the stored user profile, which traffic handler server of the plurality of traffic handler servers shall forward the message to the first SIP user equipment, and which traffic handler server of the plurality of traffic handler servers shall forward the message to the second SIP user equipment.

6. The method of claim 3 wherein the controller server is configured to select a traffic handler server providing the services associated with the capabilities common to all user equipment.

7. The method of claim 1 wherein the SIP based communications network comprises an Internet protocol Multimedia Subsystem communications network.

8. A system for forwarding a message in a Session Initiation Protocol (SIP) based communications network and to a first SIP User Equipment associated with a SIP User Agent corresponding to a subscriber and to a second SIP User Equipment associated with the User Agent corresponding to the subscriber, the first SIP User Equipment having first capabilities and the second SIP User Equipment having second capabilities different from the first capabilities, the system comprising:

a controller server comprising a Serving Call Session Control Function entity associated with the subscriber, the controller server configured to handle SIP registrations and maintain subscriber data; and a plurality of traffic handler servers comprising Serving Call Session Control Function entities, each traffic handler server configured to handle at least one of SIP sessions and third party registrations;

wherein the controller server is configured to:
receive the message;
determine which first traffic handler server of the plurality of traffic handler servers is configured to provide a first service associated with the first capabilities, and determine which second traffic handler server of the plurality of traffic handler servers is configured to provide a second service associated with the second capabilities; and forward the message to the first SIP User Equipment via the first traffic handler server, and forward the message to the second SIP User Equipment via the second traffic handler server.

9. The system of claim 8 wherein the controller server comprises a repository associated therewith, the repository configured to store information with respect to each traffic handler server of the plurality of traffic handler servers relating to the services each traffic handler server is configured to offer.

10. The system of claim 9 wherein the controller server is further configured to determine, based on the information with respect to each traffic handler server and a user profile associated with the subscriber, which traffic handler server of the plurality of traffic handler servers shall forward the message to the first SIP user equipment, and which traffic handler server of the plurality of traffic handler servers shall forward the message to the second SIP user equipment, the user profile including an indication of services which the subscriber is at least one of able to use and allowed to use.

11. The system of claim 10 wherein the indication of services relates to the first and second capabilities.

12. The system of claim 10 wherein the controller server is further configured to select a traffic handler server providing the services associated with the capabilities common to all user equipment.

13. The system of claim 8 wherein the SIP based communications network comprises an Internet protocol Multimedia Subsystem communications network.

14. The system of claim 8 wherein the first and second services are located in SIP-Application Servers associated with the traffic handler servers.

15. The system of claim 8 wherein the controller server and at least one traffic handler server are arranged in a monolithic structure.

16. The system of claim 15 wherein the monolithic structure comprises a monolithic Serving Call Session Control Function server.

17. A server entity comprising a Serving Call Session Control Function entity for forwarding a message in a Session Initiation Protocol (SIP) based communications network, to a first SIP user equipment associated with a SIP User Agent and to a second SIP user equipment associated with the SIP User Agent, the first SIP user equipment having first capabilities and the second SIP user equipment having second capabilities different from the first capabilities, wherein the server entity is configured to:
    receive the message at the server entity, the server entity configured to handle SIP registrations and maintain subscriber data;
    determine which first network node of a plurality of network nodes comprising Serving Call Session Control Function entities is configured to provide a first service associated with the first capabilities, and determine which second network node of the plurality of network nodes is configured to provide a second service associated with the second capabilities, each network node configured to handle at least one of SIP sessions and third party registrations; and
    forward the message to the first SIP user equipment via the first network node, and forward the message to the second SIP user equipment via the second network node.

\* \* \* \* \*